(12) United States Patent
Goldstein et al.

(10) Patent No.: US 7,578,071 B2
(45) Date of Patent: Aug. 25, 2009

(54) FLUID RESERVOIR WIPER ASSEMBLY

(75) Inventors: Fredric Goldstein, Nacka (SE); Robert Murray Barto, Jr., Palm Beach Gardens, FL (US)

(73) Assignee: Group One Ltd., Ramsey, Isle of Man (GB)

( * ) Notice: Subject to any disclaimer, the term of this patent is extended or adjusted under 35 U.S.C. 154(b) by 0 days.

(21) Appl. No.: 12/053,815

(22) Filed: Mar. 24, 2008

(65) Prior Publication Data

US 2008/0216858 A1    Sep. 11, 2008

Related U.S. Application Data

(63) Continuation-in-part of application No. 11/553,644, filed on Oct. 27, 2006, now Pat. No. 7,360,319.

(51) Int. Cl.
*G01F 23/04* (2006.01)
*A46B 17/08* (2006.01)

(52) U.S. Cl. .................. 33/725; 401/122; 401/126; 401/129

(58) Field of Classification Search .............. 33/722, 33/723, 724, 725, 726, 730; 401/121, 122, 401/126, 128, 129, 130
See application file for complete search history.

(56) References Cited

U.S. PATENT DOCUMENTS

| | | | |
|---|---|---|---|
| 2,855,682 A | 10/1958 | Norgard | |
| 3,098,254 A | 7/1963 | Rose | |
| 3,549,266 A * | 12/1970 | Vasas | ............... 401/122 |
| 3,686,702 A | 8/1972 | Jordan | |
| 3,703,038 A | 11/1972 | Smith | |
| 3,998,235 A | 12/1976 | Kingsford | |
| 4,241,743 A | 12/1980 | Schnabel et al. | |
| 4,433,928 A | 2/1984 | Kingsford | |
| 4,609,300 A | 9/1986 | Robert | |
| 4,891,859 A | 1/1990 | Tremblay | |
| 4,942,669 A | 7/1990 | Schnedl | |
| 4,975,998 A | 12/1990 | Anderson et al. | |
| 5,086,793 A | 2/1992 | Kingsford | |
| 5,099,584 A | 3/1992 | Williams | |
| 5,284,239 A * | 2/1994 | Kiricoples | ............... 401/122 |
| 5,485,681 A | 1/1996 | Hitchcock | |
| 5,598,602 A | 2/1997 | Gibson | |
| 5,765,255 A | 6/1998 | Bychkowsky | |
| 6,018,882 A | 2/2000 | Brousseau | |
| 6,264,390 B1 | 7/2001 | Lee et al. | |
| 6,289,601 B1 | 9/2001 | Bricker | |
| 6,502,584 B1 | 1/2003 | Fordham | |

(Continued)

FOREIGN PATENT DOCUMENTS

JP    346519    2/1991

*Primary Examiner*—G. Bradley Bennett
(74) *Attorney, Agent, or Firm*—Carlson, Gaskey & Olds PC

(57) ABSTRACT

A fluid reservoir wiper assembly has a fluid reservoir for storing a fluid. There is an inserter for insertion into the fluid reservoir. A wiper for wiping fluid from the inserter has a first wiping position and a second wiping position within the fluid reservoir. The first wiping position is closer to the inserter than the second wiping position. A block is configured to be disposed between the wiper and the inserter. The block is configured to selectively allow the wiper to move between the first wiping position and the second wiping position.

20 Claims, 14 Drawing Sheets

U.S. PATENT DOCUMENTS

| | | |
|---|---|---|
| 6,676,320 B1 | 1/2004 | Wainer |
| 2005/0249538 A1* | 11/2005 | Patel .......................... 401/126 |
| 2005/0271454 A1* | 12/2005 | Gueret ....................... 401/129 |
| 2008/0273914 A1* | 11/2008 | Hamada ..................... 401/124 |
| 2009/0065019 A1* | 3/2009 | Salciarini ................... 401/121 |

* cited by examiner

FLUID RESERVOIR WIPER ASSEMBLY

CROSS REFERENCE TO RELATED APPLICATIONS

This application is a continuation-in-part to U.S. Non-Provisional application Ser. No. 11/553,644 which was filed on Oct. 27, 2006 now U.S. Pat. No. 7,360,319.

BACKGROUND OF THE INVENTION

This invention relates to a fluid reservoir having a wiper.

A commercial fluid container has a fluid reservoir for storing a fluid. There may be an inserter provided with the fluid container to check its fluid level in the case of an oil reservoir for a vehicle or to distribute fluid from the container in the case of a mascara bottle. For these commercial products, the inserter is left in the reservoir for convenience. Due to the viscosity of fluid, fluid will tend to collect on the inserter and may interfere with the accurate measurement of fluid or the controlled distribution of fluid. It may be desirable to withdraw the inserter and wipe it clean of fluid prior to measuring or applying the fluid. This may be inconvenient, messy as well as wasteful.

For example, a dip stick, is used to measure oil in an oil pan or, more broadly, an oil reservoir of a vehicle. Typically, the dip stick remains inserted in a housing that is connected to the oil reservoir. The dip stick will typically have some markings, which serve to reflect the level of oil in the reservoir. During normal operation of the vehicle, oil will splash onto the dip stick at points that do not accurately reflect the oil level. When the oil level is checked, the dip stick is removed from the housing and is typically wiped clean with a cloth. The dip stick is then reinserted into the housing and then removed again to read the oil level, which then provides an accurate reflection of the oil level in the reservoir.

This technique for checking the oil level in a vehicle has its drawbacks. Specifically, the technique is messy. One must have ready some way to wipe the dip stick clean, which is typically a cloth, paper towel or rag. Also, the cloth or such used to wipe the dip stick must be thrown away because it is difficult or impractical to clean, both wasting the cloth and causing the inconvenience of its disposal. Oil is also wasted because oil on the dip stick is left on the cloth rather than returned to the oil reservoir.

There have been efforts to simplify this process. Electronic systems exist that measure the level of oil in the vehicle. However, these systems are often unreliable or expensive. In addition, they normally only indicate if the level is low, not how low or how much oil is required to reach the proper level. Manual systems also exist that include wiping mechanisms on the housing. Although preferable to wiping the dip stick with a rag, these assemblies may be complicated, awkward to use or expensive.

Another example of a commercial fluid container relates to the application and measure of a liquid, such as mascara and the like, housed in a bottle, including a brush or other applicator means, whereby the user may decide a predetermined amount of liquid on the applicator.

As relates to the cosmetic industry, mascara is a standard manner in which eyes are decorated and enhanced by its application on eyelashes. Common in most all mascara products is an elongated enclosed bottle which includes a cap. Attached to the cap is typically a brush which descends the depth of the housing. Within the housing is an amount of mascara liquid.

Because of the viscous nature of the mascara liquid, the brush would exit the bottle fully (and unevenly) loaded with mascara, making it impractical for application to fine eyelashes. To address this problem, most cosmetic companies insert a rubber type plug into the opening of the housing. This plug itself has an opening, typically around 4 mm, which corresponds to the width of the brush. Ideally, upon removal of the brush from the housing, by passing through the opening in the plug the brush will have a pre-determined contact with the opening with the goal that the same amount of mascara will exit with the brush with each removal.

The problem with this system is that a compromise amount of mascara must be determined upon design and production. The opening is non-adjustable and therefore the user cannot increase or decrease the amount of mascara on the brush. The cosmetic company determines a single measure as the middle ground amount and the opening corresponds to that amount.

If the user should desire a larger amount of mascara, it would not be possible to obtain a fully loaded brush with the one-size-fits-all opening. Nor, if so desired, can the user obtain a lesser amount of mascara on the brush without using a tissue to manually wipe off the brush.

Another problem is that mascara typically coagulates over time and after repeated use, as with air entering the housing, the liquid loses water content, becoming more viscous. The opening which may have suited new free flowing mascara may no longer suit older thicker mascara and undesired clumps of mascara may remain on the applicator.

To remove this unwanted mascara, a user may wipe the applicator with a tissue before its application. However, as a consequence of this design, the user must carry a tissue or other wipe for the applicator, wipe the applicator, and then later dispose of the wipe after its use. These steps are inconvenient for the user. Moreover, excess mascara is simply wasted. Given the relatively high cost of mascara, it would be preferable to keep this excess mascara in the bottle until needed.

Additionally, this older thicker mascara, reduced in volume, may more readily stick to the sides of the housing, making it impossible for the brush to angle to reach it due to the restrictive nature of the plug opening. The undesired result is an unsatisfactory percentage of mascara remaining beyond the reach of the brush and so requiring the user to dispose of the product before it is actually fully used.

Similar problems exist with other cosmetic fluids, such as lip gloss and nail polish, both of which also employ an applicator which obtains the cosmetic fluid from a bottle.

A need therefore exists for a fluid reservoir assembly that allows for the adjustment of the amount of cosmetic fluid a which remains on the applicator upon exiting the bottle.

SUMMARY OF THE INVENTION

One aspect of the invention comprises a dip stick assembly and related technique. The dip stick has a measure for reading the oil level of an oil reservoir of a vehicle. The dip stick is received in a housing, which allows the dip stick to be inserted into the oil reservoir. To facilitate cleaning, the dip stick has wipers attached to the housing. The wipers have an engaged position and a disengaged position. In the engaged position, the wiper is in contact with the dip stick. In the disengaged position, the wiper is out of contact with the dip stick.

The wipers may be resiliently biased into the engaged position so that the dip stick is automatically wiped when removed from the housing. A block is provided to prevent the wiper from moving into the engaged position. The block is moveable between a blocking position and an unblocking position. In the blocking position, the block maintains the wiper in the disengaged position, while, in the unblocking position, the block permits the wiper to move to the engaged position.

The inventive dip stick assembly provides an automatic technique for cleaning the dip stick assembly. The dip stick is placed in communication with an oil reservoir. The wipers are biased into engagement with the dip stick. The wiper, however, is prevented from engaging the dip stick by the block. The block is then removed to allow the wiper to contact the dip stick and wipe it. The dip stick is then reinserted. The block is returned to the blocking position and left there. When the dip stick is removed, the wipers remain in the disengaged position, thereby allowing the dip stick to be removed without wiping, thereby providing a simple and inexpensive assembly and technique for cleaning and reading the dip stick.

Another aspect of the invention involves a cosmetic bottle for storing a liquid cosmetic. An applicator for applying the cosmetic fluid is provided and is insertable and removable from the bottle along a path. A wiper for wiping the cosmetic fluid from the applicator is disposed within the bottle. The wiper has a first wiping position and a second wiping position. The wiper is closer to the applicator in the first wiping position than in the second wiping position when the applicator is moved along the path. A block is configured to be disposed between the wiper and the applicator. The block is configured to selectively allow the wiper to move between the first wiping position and the second wiping position.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figures 1, 2:
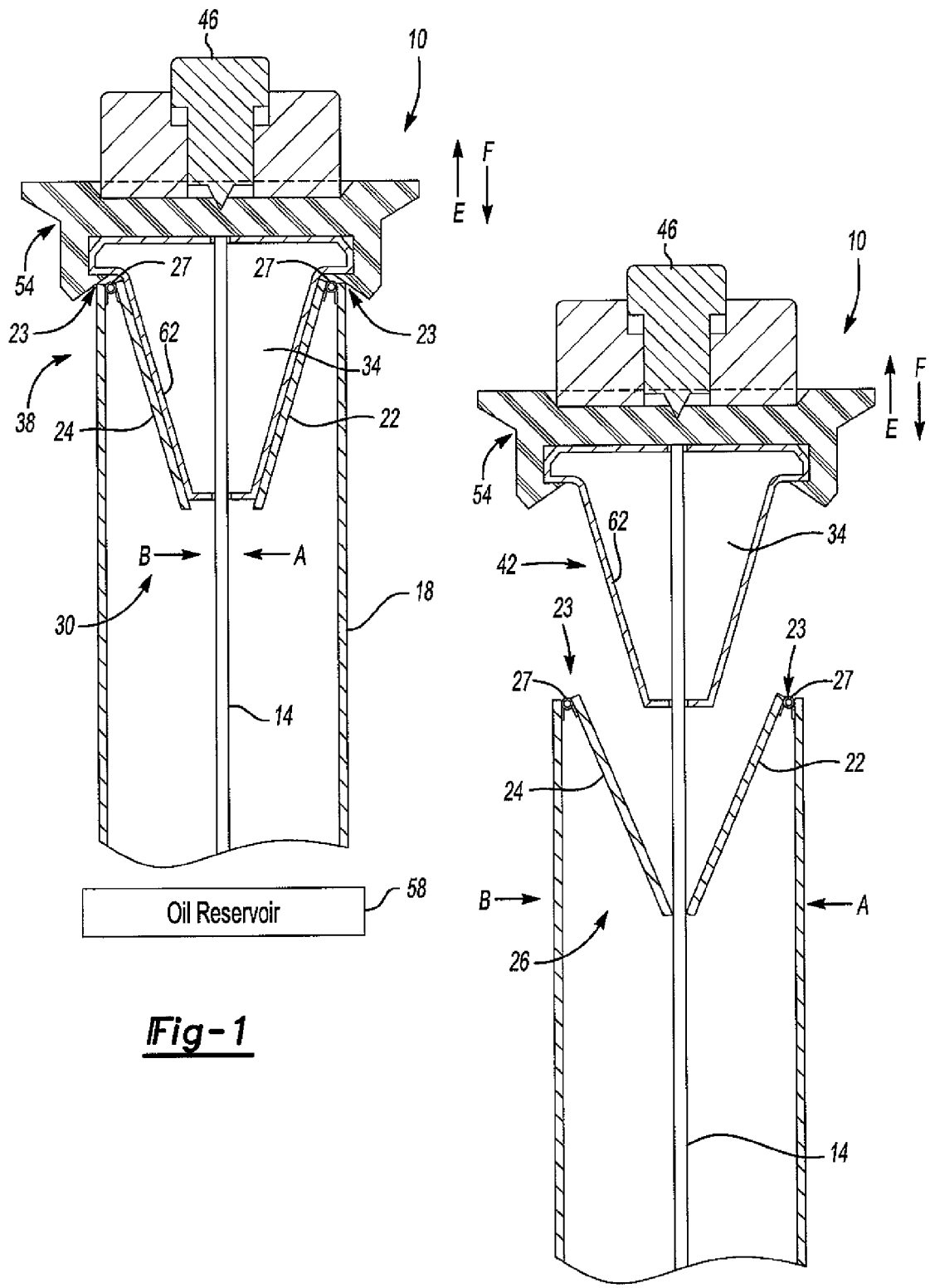
FIG. 1 illustrates a version of the inventive dip stick assembly, including dip stick, housing, wipers and block.
FIG. 2 illustrates the dip stick assembly of FIG. 1 in which the wipers are in the engaged position to wipe the dip stick.

FIG. 1 illustrates inventive dip stick assembly 10. Dip stick assembly 10 has an inserter, here dip stick 14, disposed in housing 18 as shown. Housing 18 is connected to oil reservoir 58 in a vehicle. Dip stick 14 has markings 15 that permit the fluid level of oil reservoir to be read by dip stick 14 as known.

In contrast to existing assemblies, dip stick assembly 10 has wipers, such as wipers 22 and 24, which pivot between engaged position 26 as shown in FIG. 2 and disengaged position 30 as shown in FIG. 1. Wipers 22, 24 are connected to housing 18 and are resiliently biased by springs 27 to engaged position 26, which is in contact with dip stick 14 as shown in FIG. 2. Wiper 22 is connected to housing 18 at pivot 23 while wiper 24 is connected to housing 18 at pivot 25. Within pivot 23 and pivot 25 are springs 27 that urge wiper 22 in the direction of arrow A and urge wiper 24 in direction of arrow B when wiper 22 and 24 are in the disengaged position 30 as shown in FIG. 1.

Maintaining wiper 22 and 24 from engaged position 26 is block 34. Block 34 comprises a frustroconical hollow insert that is sized to be received within housing 18. Block 34 has inclined surface 62 that engages wipers 22 and 24 and facilitates insertion of block 34 between wipers 22, 24. When block 34 is withdrawn in the direction of arrow E, as shown in FIG. 2, to unblocking position 42, wipers 22 and 24 move in the direction of arrow A and the direction of arrow B, respectively, because of their spring bias toward engaged position 26. In engaged position 26, as shown in FIG. 2, wiper 22 and 24 contact dip stick 18 so that when dip stick 14 is withdrawn, wipers 22 and 24 wipe excess oil off dip stick 14. In this way, wiper 22 and 24 automatically engage dip stick 14 so that dip stick 14 may be wiped simply by withdrawing block 34 and dip stick 14 in the direction of arrow E. It will be appreciated that the blocking structure may comprise any form which prevents the engagement of the wipers with the dip stick, in which the block may also be, by way of example, a flat projection. Furthermore, the housing for the wiper and blocking structure need not be circular, as is normal for the pipe leading into the oil reservoir, but may also be rectangular or square. Similarly, the wipers need not have the shape of standard wipers but may additionally be a resilient slot or an orifice which will retain or revert back to its original shape or position after a blocking structure is inserted in order to perform the repeated function of wiping the dip stick in a subsequent oil check. A wiper then is any structure which performs the function of wiping.

As shown in FIG. 2, wiper 22 and 24 are located within housing 18. This permits oil wiped from dip stick 14 to be returned to oil reservoir 58 because wiped oil remains in housing 18. After dip stick 14 is withdrawn in the direction of arrow E, it may then be reinserted into housing 18 by moving it in the direction of arrow F. Now, dip stick 14 is exposed to oil reservoir 58 after having been wiped by wiper 22 and 24.

Figure 3:
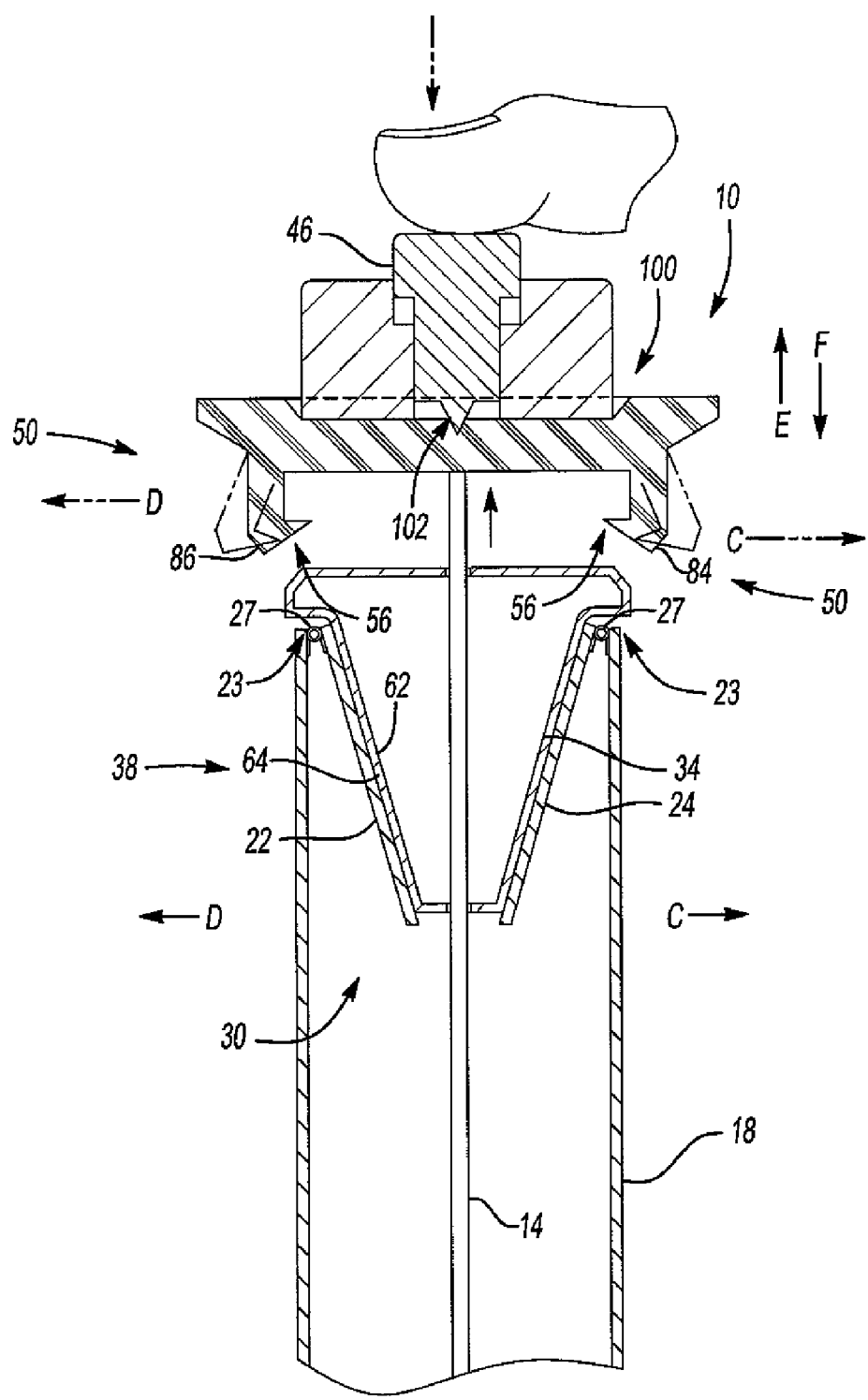
FIG. 3 illustrates the block of FIGS. 1 and 2 in a blocking position to prevent the wipers from wiping the dip stick.

Block 34 is releasably coupled to dip stick 14 by catches 84, 86, which are formed as part of cap 100. Cap 100 is connected to dip stick 14. Block 34 is shown in unreleased position 54 in FIGS. 1 and 2. Cap 100 and catches 84, 86 are made of a resilient material, such as plastic. Release 46 is slideably received in cap 100 and may move in the direction of arrow F to apply pressure to break 102, which is a channel in the plastic to permit flexing of catches 84, 86 in the direction of arrows C and D, respectively. To prevent dip stick 14 from being wiped again, as shown in FIG. 3, release 46 is actuated by depressing it in the direction of arrow F. This action causes catches 84, 86 to bend resiliently in the direction of arrow C for catch 84 and in the direction of arrow D for catch 86. Catches 84 and 86 accordingly pivot away from block 38 to release block 34 to released position 50 wherein block 34 is no longer coupled to catches 84 and 88 and consequently dip stick 14. Hence, when dip stick 14 is moved in the direction of arrow E and lifted from housing 18, as shown in FIG. 3, block 34 is left in blocking position 38 to prevent wiper 22 and 24 from contacting dip stick 14, maintaining wipers 22, 24 in disengaged position 30. Hence, when dip stick 14 is withdrawn, wipers 22 and 24 will not wipe dip stick 14. Dip stick 14 may then be withdrawn with oil unwiped from dip stick, thereby allowing dip stick 14 to be read for an accurate measurement of oil in oil reservoir 58. As shown, block 34 has a hollow 64 that permits dip stick 14 to slide freely within block 34 when block 34 is released from cap 100.

Figure 4:
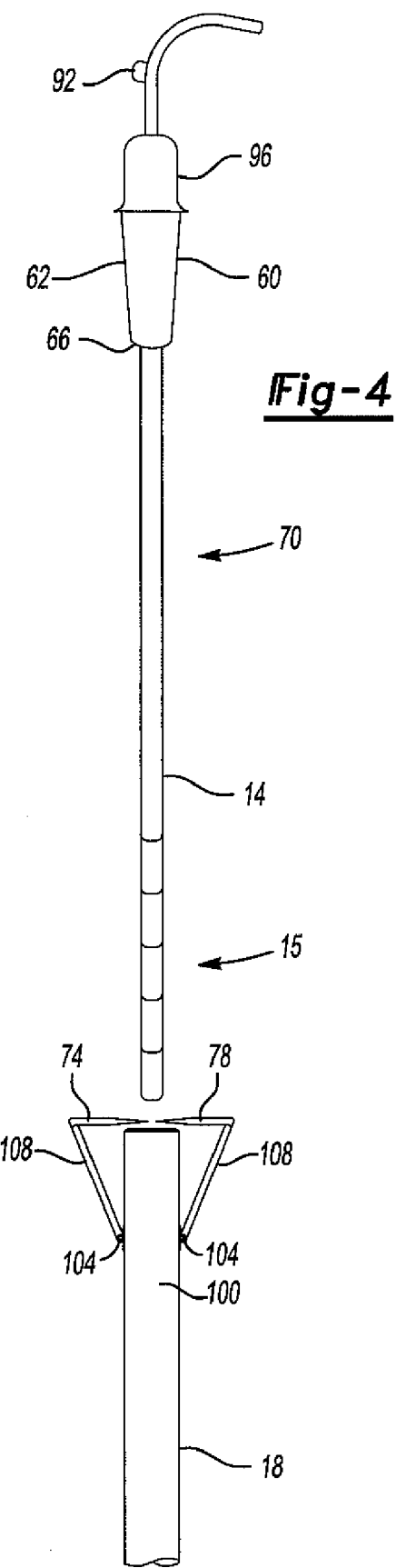
FIG. 4 illustrates an alternative version of the inventive dip stick assembly.
Figure 5:
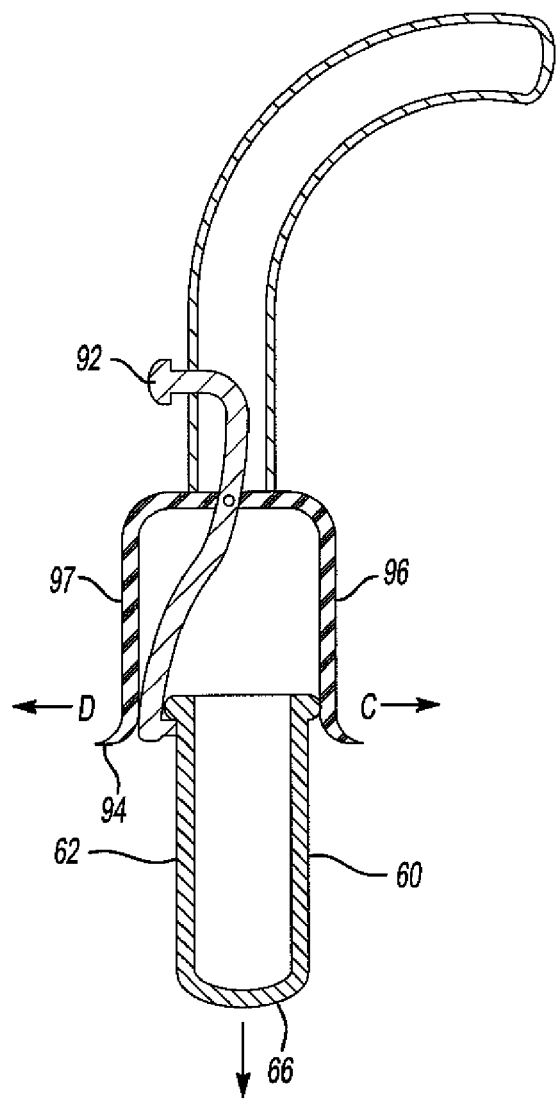
FIG. 5 illustrates a block and release of the version of FIG. 4.

FIG. 4 illustrates an alternative version of the inventive dip stick assembly. Here, dip stick assembly 70 has block 60. Block 60 has inclined surface 62 as well as curved portion 66. Like block 34, block 60 is hollow and slideably receives dip stick 14. Cap 96 is secured to dip stick 14. Furthermore, assembly 70 has release 92 that when actuated, moves catch 94 by lever 97 in the direction of arrow D to release block 34 from engagement with cap 96. Ball bearings are provided on cap 96 to permit block 60 to be slideably received within cap 96.

In addition, as shown in FIG. 4, wipers 74 and 78 are attached externally to housing 18, thereby permitting wipers 74 and 78 to be added to a vehicle in the aftermarket. They are mounted by fastener 100, which has springs that are attached to housing 18 and arms 108. As in the previous version, wiper 74 and 78 are resiliently biased to engage dip stick 14 when dip stick is inserted. Dip stick 14 is operated in the same way as dip stick assembly 10.

Figures 6, 7:
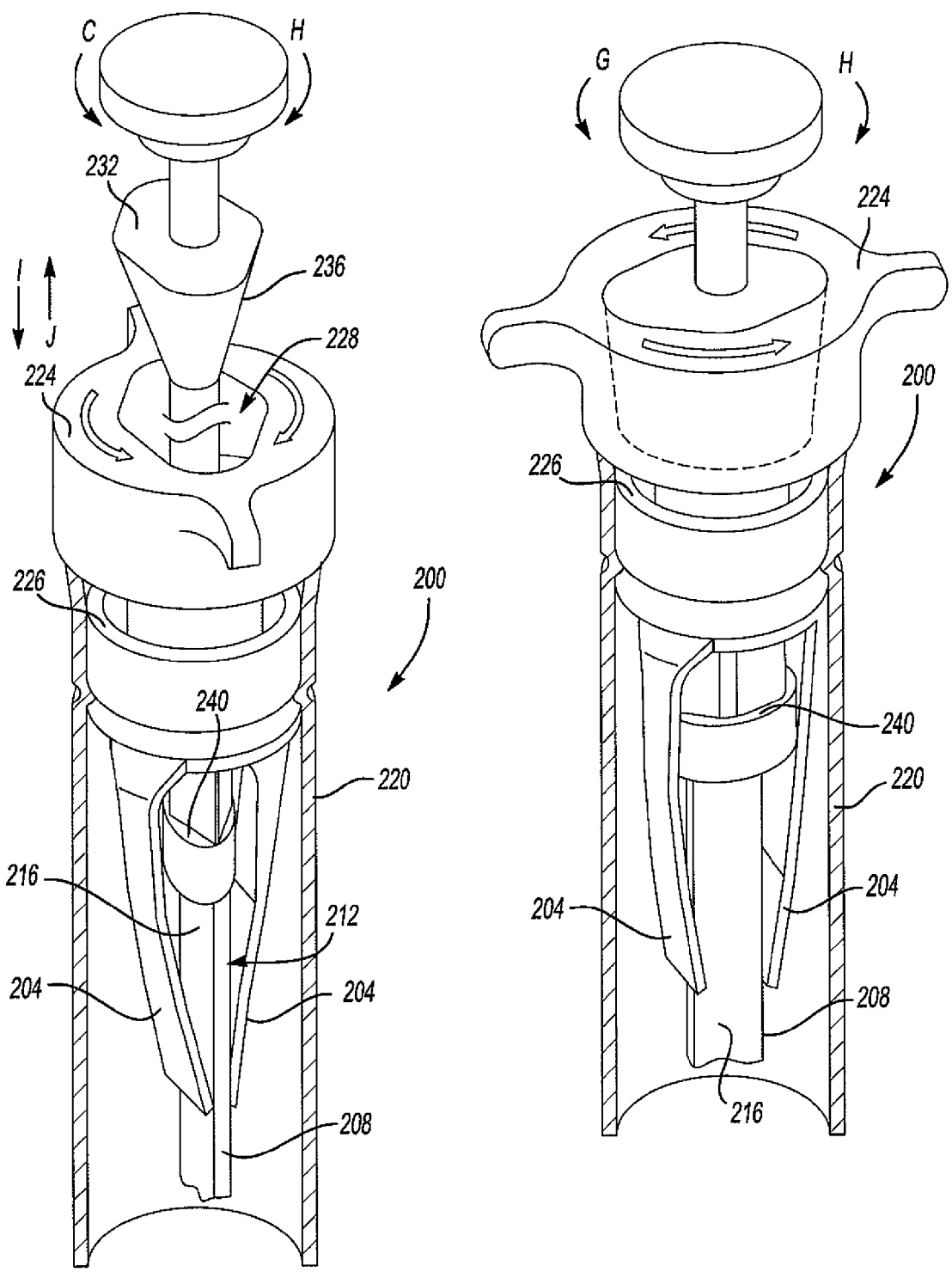
FIG. 6 illustrates another version of the inventive dip stick assembly with dip stick in unblocking position.
FIG. 7 illustrates the version of the inventive dip stick assembly of FIG. 6 with dip stick in blocking position.

FIGS. 6 and 7 illustrate another version of the inventive dip stick assembly. Dip stick assembly 200 has dip stick 208 disposed in housing 220, which is connected to an oil reservoir as known. Dip stick 208 is long enough to extend into the oil reservoir to accurately gauge the oil level. Disposed in housing 220 is wiper support 226, which is locked in place to prevent movement in the direction of arrows I or J or rotation in the direction of arrows G or H. Wiper support 226 has wipers 204. Like the other versions of the invention, dip stick assembly 200 has wipers 204 resiliently biased into engagement with dip stick.

In FIG. 6, dip stick 208 is wiped by lifting dip stick 208 in the direction of arrow J. This action causes dip stick 208 to be wiped by wipers 204, which are resiliently biased into engagement with face 212 and face 216 of dip stick 208. Face 212 and face 216 has markings, such as a standard gauge for measuring oil level. Hence, faces 212 and 216 of dip stick 208 are cleaned before reinsertion into oil reservoir. Dip stick 208 is returned to a position where it is in contact with the oil level by lowering dip stick 208 in the direction of arrow I. Dip stick 208 is guided by guide 224 that has hole 228 shaped to receive mating component 232 so that when mating component 232 is returned to hole 228, face 212 and face 216 are in contact with wipers 204. This feature ensures the correct orientation of dip stick 208 and its faces 212, 216 relative to wipers 204 so that wipers 204 may contact face 212 and face 216 to clean the surfaces of oil.

Also, the cleaning of dip stick 208 may be done without removal of dip stick 208 from housing 220, thereby ensuring wiped oil remains within housing 220. Dip stick 208 is provided with upper stop 236 and lower stop 240. Upper stop 236 prevents dip stock 208 from traveling in the direction of arrow I beyond the point where dip stick 208 is calibrated with markings so that dip stick 208 will accurately measure the oil level. Guide 224 holds upper stop 236 at this point by preventing stop 236 from passing through hole 228 because of hole 228's tapering shape. Lower stop 240 prevents dip stick 208 from being removed from housing 220 by its interference with wiper support 226.

Figure 7A:
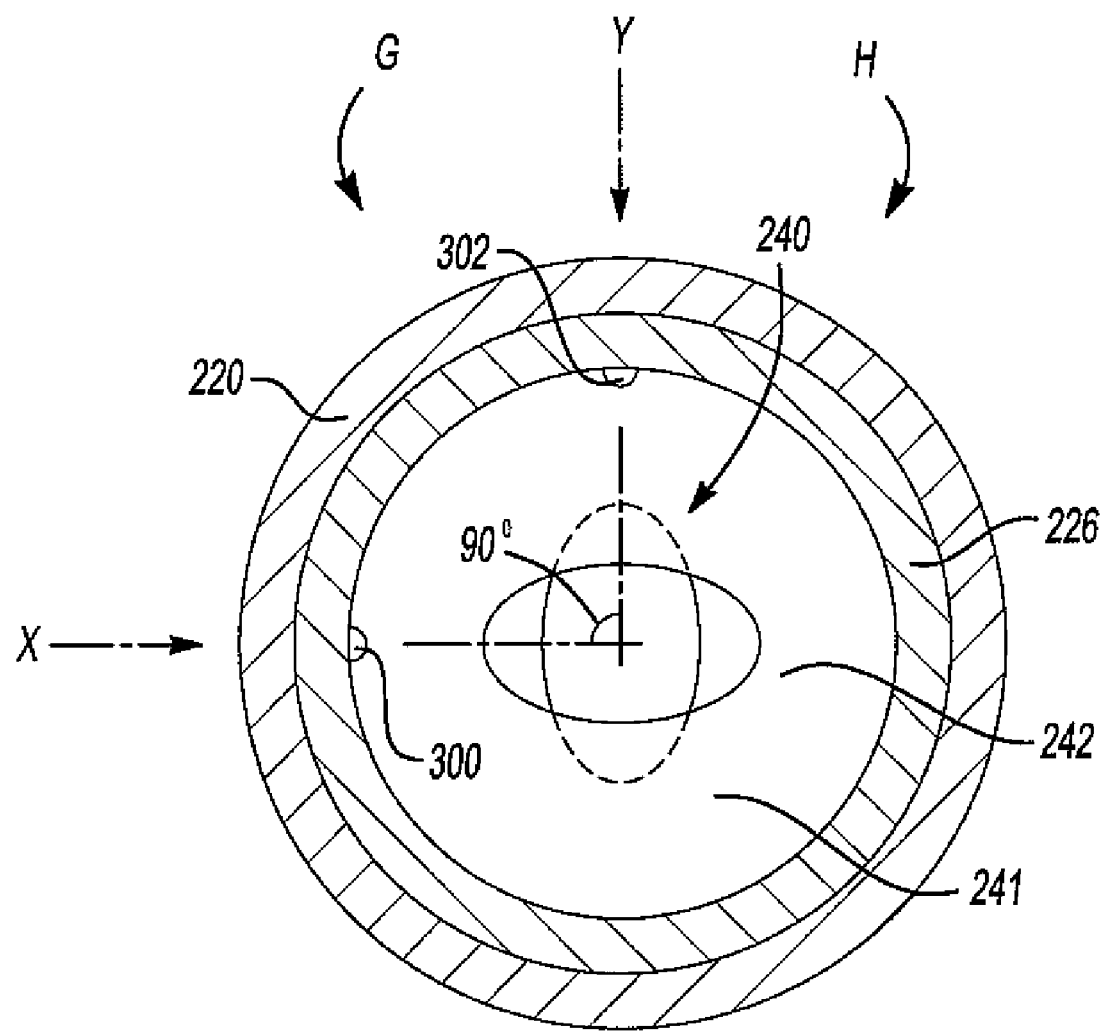
FIG. 7A illustrates a plan view of the wiper support for the wipers of the dip stick assembly of FIGS. 5-7.

FIG. 7A illustrates a plan view of housing 220 and wiper support 226 in the direction of arrow I, as shown in the position of FIG. 6. As can be seen, wiper support 226 has a base 241 with hole 242 which is shaped and sized like wiper support 240 but, in this position, rotated about ninety degrees (90°) from the mating shape of wiper support 240. In this position of FIGS. 6 and 7A, wiper support 240 is blocked from moving past base 241. Hence, upper stop 232 is prevented from traveling beyond guide 224 while lower stop 240 is prevented from traveling past base 241 of wiper support 240. In this way, dip stick 208 can be pumped down in the direction of arrow I and pulled up in the direction of arrow J to clean dip stick 208 without removing it completely from its housing. It will be understood by one of ordinary skill in the art that wipers 204 must contact dip stick 208 at a point low enough so that when lower stop 240 is at the point of base 241, wipers 204 will have wiped all of the level markings.

Figure 8:
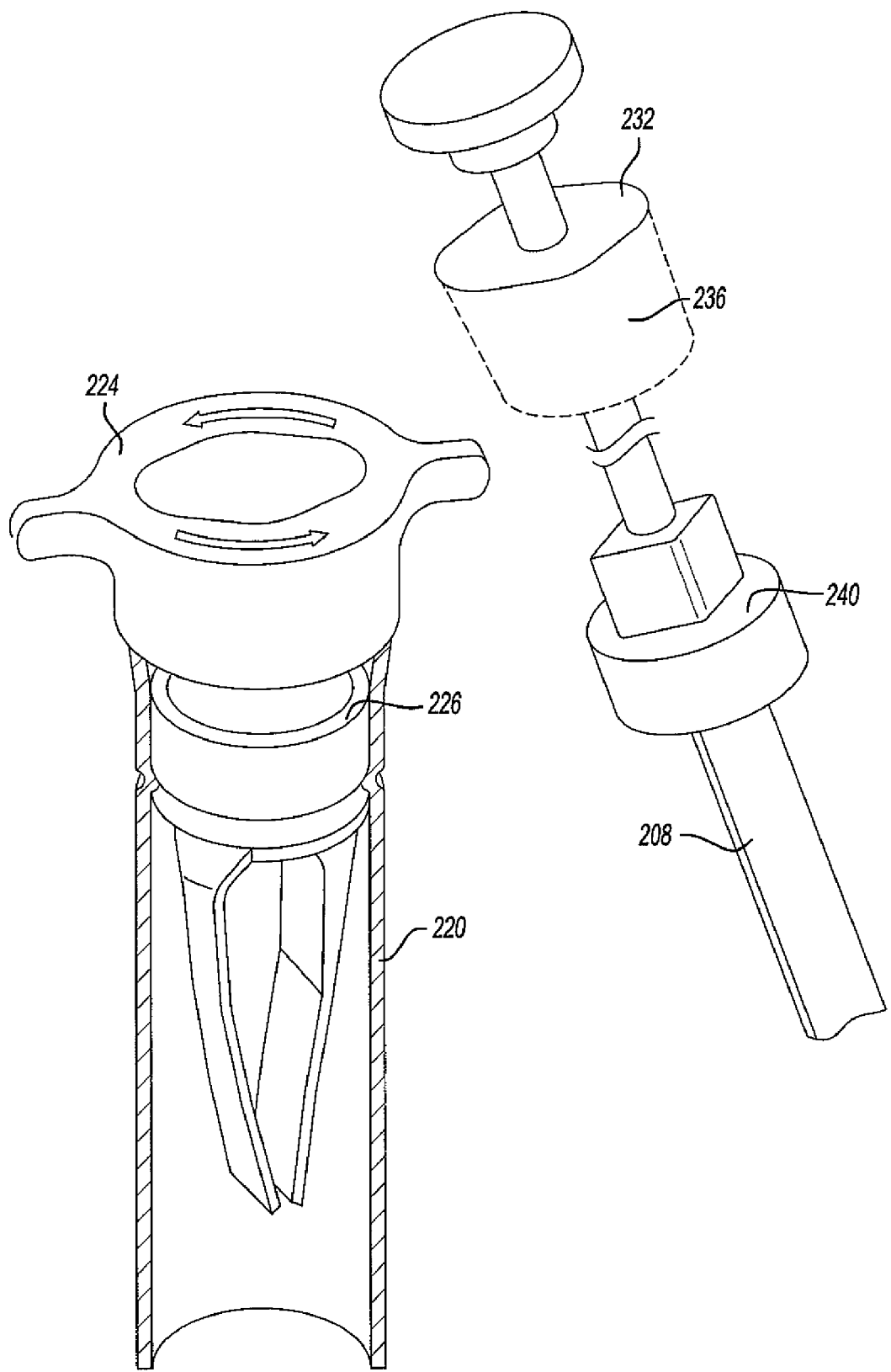
FIG. 8 illustrates the version of the inventive dip stick assembly of FIGS. 6 and 7 with dip stick removed from its housing.

Guide 224 is rotatably mounted to housing 220 to allow its movement in the direction of arrows G or H but to prevent its movement in the directions of arrows I or J. As shown in FIG. 7A, stops 300 and 302 are provided on wiper support 226 or, alternatively, on housing 220, so that guide 224 may rotate 90 degrees between position X and position Y. Stops 300 and 302 may be detents. As shown in FIG. 7, to read dip stick 208 following wiping, guide 224 is rotated from position shown in FIG. 6 in the direction of arrow G, say 90°. Rotation to position X causes dip stick 208 to block wipers 204 from engaging face 212 and face 216 of dip stick 208. Also, as shown in FIG. 7A, lower support 240 will likewise be rotated to position X by rotation of guide 224 to this position so that lower stop 240 may now pass hole 242. Lower stop 240 should be sized to pass freely through hole 228 too. Accordingly, as shown in FIG. 8, when dip stick 208 is withdrawn with guide 224 in the direction of arrow D, dip stick 208 may then be read without having oil wiped off by wipers 204.

Figure 9A:
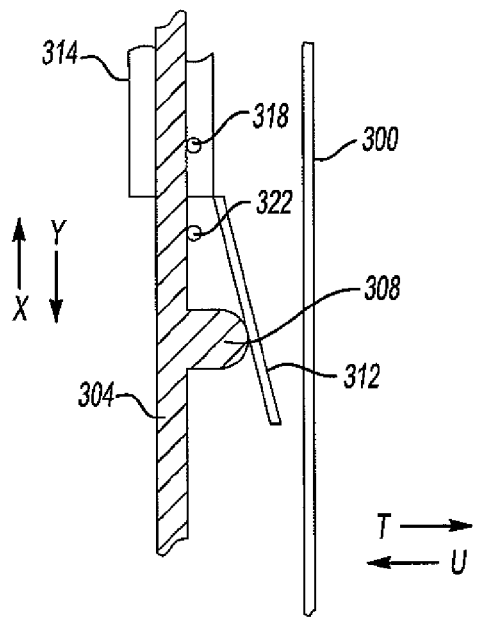
FIG. 9A illustrates another version of a dip stick assembly according to the invention with wipers disengaged.

FIG. 9A illustrates another version of the invention. As shown, dip stick 300 is disposed in housing 304, which is only partially shown. Here, the invention is shown schematically but one of ordinary skill in the art would understand that housing 304 may surround dip stick 300 as known. Housing 304 has block 308, which is here a protrusion extending from its surface toward dip stick 300. Wiper 312 is shown out of contact with dip stick 300 and resting on block 308. Wiper 312 may be resiliently biased away from contact with dip stick 300. Further, wiper 312 is pivotally mounted on carrier 314, which is slideably received on housing 304 and is configured to move up in the direction of arrow X or down in the direction of arrow Y. Wiper 312 may pivot in the direction of arrow T to move toward dip stick 300 or in the direction of arrow U away from dip stick 300.

Figure 9B:
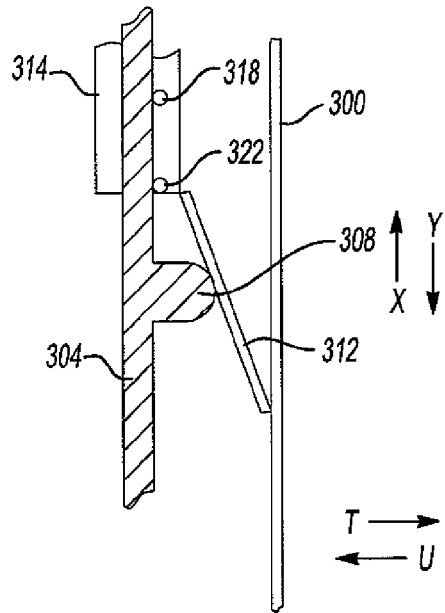
FIG. 9B illustrates the version of the dip stick assembly of FIG. 9A with the wipers engaged.

To place wiper 312 in contact with dip stick 300, as shown in FIG. 9B, carrier 314 slides down housing 304 in the direction of arrow Y, which causes wiper 312 to pivot in the direction of arrow T on block 308. As dip stick 300 is withdrawn from housing 304 in the direction of arrow X, wiper 312 then cleans dip stick 300 of excess oil. Dip stick 300 is then returned to housing 304 in the direction of arrow Y. Carrier 314 is then moved in the direction of arrow X, causing wiper 312 to pivot away from dip stick 300 in the direction of arrow U so that dip stick 300 may then be withdrawn to take an accurate measurement of the oil level on dip stick 300 without being wiped by wiper 312. Detents 318 and 322, such as an indentation and receiving protrusion, may be provided to lock carrier 314 momentarily in position where wiper 312 is in contact with dip stick 300 and in position where wiper 312 is out of contact with dip stick 300.

Figure 10A:
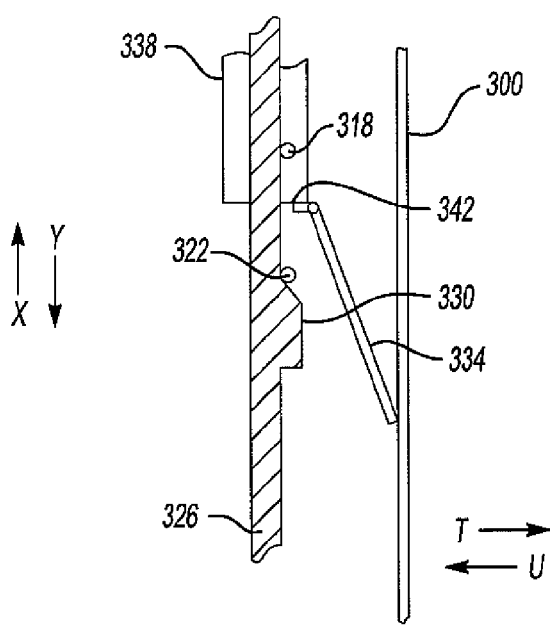
FIG. 10A shows another version of the invention with wipers engaged.
Figure 10B:
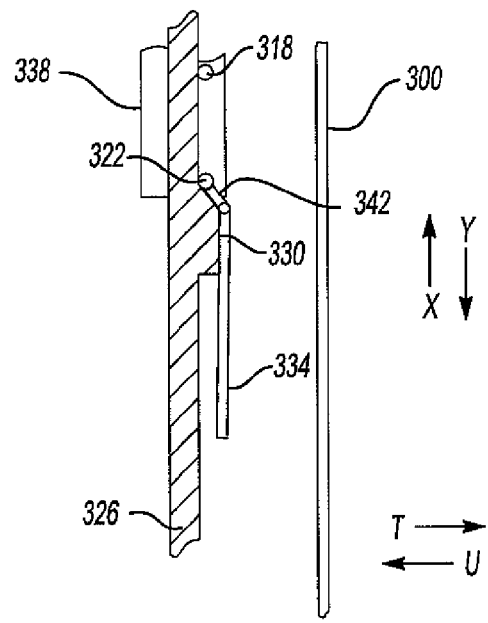
FIG. 10B shows the version of the invention of FIG. 10A with wipers disengaged.

Turning now to FIGS. 10A and 10B, another version of the invention is shown. FIG. 10A shows housing 326 having block 330 extending toward dip stick 300. Wiper 334 is provided and pivotally mounted to carrier 338, which is slideably mounted to housing 326. Wiper 334 may be resiliently biased into contact with dip stick 300 as shown. Carrier 338 may be held momentarily in place by detent 318 here. Wiper 334 is also provided with catch 342. With wiper 334 in contact with dip stick 300, dip stick 300 may be withdrawn in the direction of arrow X to clean it of excess oil. Dip stick 300 may then be returned in the direction of arrow Y so that it may measure the oil level of the reservoir.

To prevent wiper 334 from wiping dip stick 300, carrier 338 is then moved in the direction of arrow Y along housing 326, overcoming the resistance to movement provided by detent 318 to a position on housing 326 shown in FIG. 10B, wherein detent 322 is engaged to momentarily hold carrier 338 in place. In this position, as shown, catch 342 of wiper 334 moves into contact with block 330, causing wiper 334 to swing away from dip stick 300 in the direction of arrow U. Wiper 334 may then be withdrawn from housing 326 again so that the fill level of oil may be correctly checked. After checking, carrier 338 may be moved back up in the direction of arrow X. Block 330 no longer holds wiper 334 out of contact with dip stick 330. Due to its resilient bias, wiper 334 returns in the direction of arrow T to its position in contact with dip stick 300 as shown in FIG. 10A.

In addition, while dip sticks have been shown as flat, dip sticks may be round with contoured wipers to engage the round cylindrical shape of the dip stick. In this way, dip stick need not be oriented relative to the wipers as the entire contoured surface of the dip stick would be wiped by the contour wipers.

Figure 11:
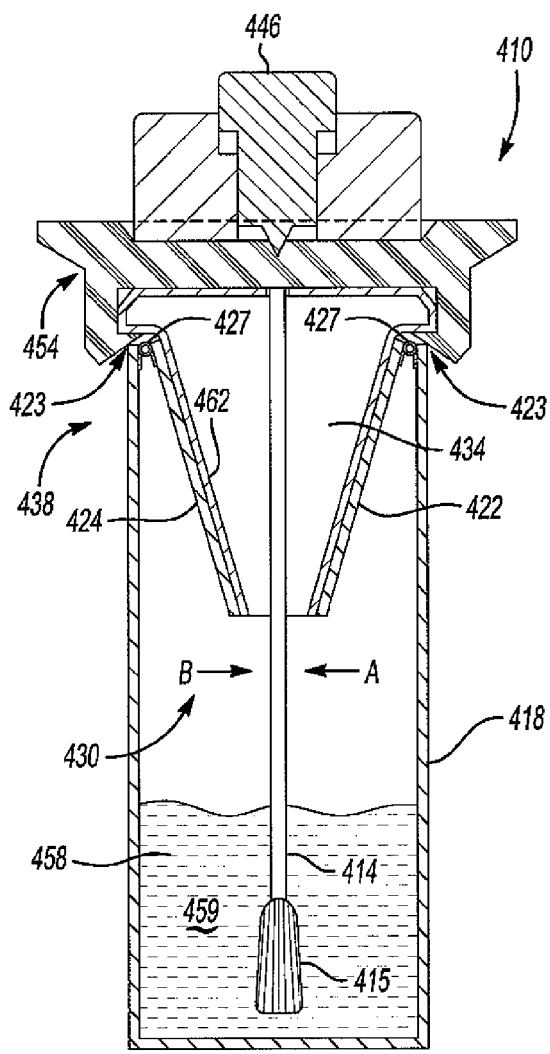
FIG. 11 illustrates a version of the inventive cosmetic bottle assembly, including applicator, bottle, wipers and block.

Another aspect of the invention involves a cosmetic container, such as a bottle for mascara. FIG. 11 illustrates inventive cosmetic bottle assembly 410. cosmetic bottle assembly 410 has an inserter, here applicator 414 having brush 415, disposed in bottle 418 as shown. Bottle 418 is a fluid reservoir 458 for a cosmetic fluid, here mascara 459.

Figure 12:
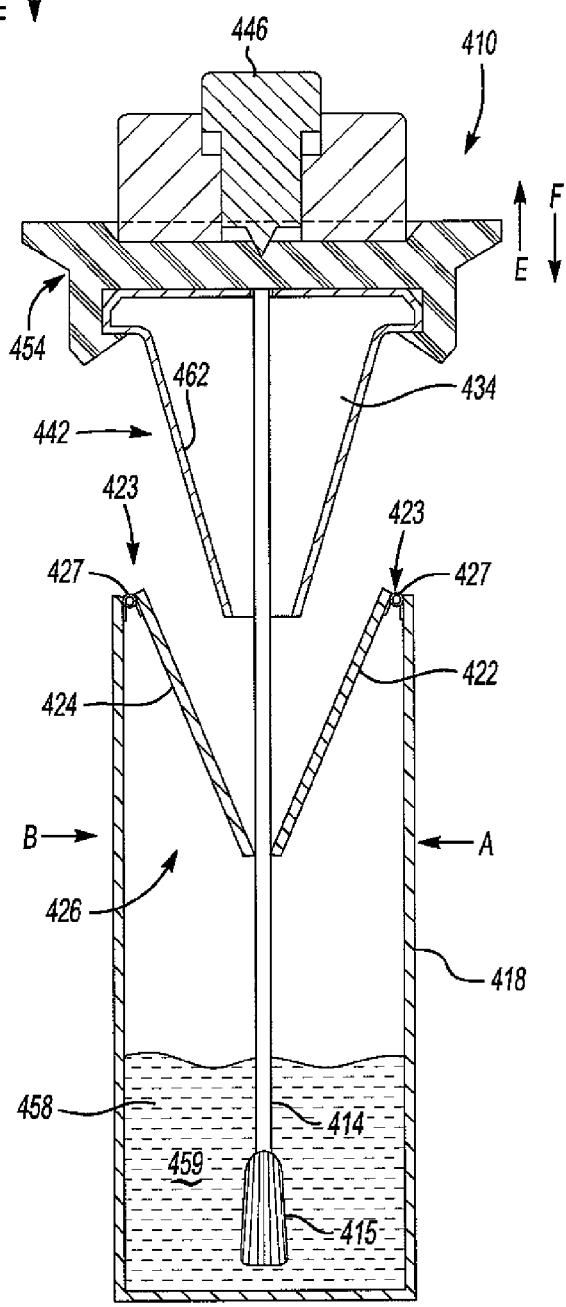
FIG. 12 illustrates the cosmetic bottle assembly of FIG. 11 in which the wipers are in a first wiping position.

Cosmetic bottle assembly 410 has wipers, such as wipers 422 and 424, which pivot between first wiping position 426 as shown in FIG. 12 and second wiping position 430 as shown in FIG. 11. Wipers 422, 424 are connected to bottle 418 and are resiliently biased by springs 427 toward first wiping position 426, which is in contact with applicator 414 as shown in FIG. 12. Wiper 422 is connected to bottle 418 at pivot 423 while wiper 424 is connected to bottle 418 at pivot 425. Within pivot 423 and pivot 425 are springs 427 that urge wiper 422 in the direction of arrow A and urge wiper 424 in direction of arrow B when wiper 422 and 424 are in the second wiping position 430 as shown in FIG. 11.

Maintaining wiper 422 and 424 from first wiping position 426 is block 434. Block 434 comprises a frustroconical hollow insert that is sized to be received within bottle 418, although the block need not be limited to this form and may have other shapes. Block 434 preferably has inclined surface 462 that engages wipers 422 and 424 and facilitates insertion of block 434 between wipers 422, 424. When block 434 is withdrawn in the direction of arrow E, as shown in FIG. 12, to first block position 442, wipers 422 and 424 move in the direction of arrow A and the direction of arrow B, respectively, because of their spring bias toward first wiping position 426. In first wiping position 426, as shown in FIG. 12, wipers 422 and 424 contact applicator 414, including brush 415, so that when applicator 414 is withdrawn, wipers 422 and 424 wipe excess oil off applicator 414. In this way, wipers 422 and 424 automatically engage applicator 414 so that applicator 414 may be wiped simply by withdrawing block 434 and applicator 414 in the direction of arrow E. From there, applicator 414 may be used to apply a controlled amount of mascara to an eyelash.

Moreover, as shown in FIG. 12, wipers 422 and 424 are located within bottle 418. This permits mascara wiped from applicator 414 to be returned to fluid reservoir 458 because wiped mascara remains in bottle 418. After applicator 414 is withdrawn in the direction of arrow E, it may then be reinserted into bottle 418 by moving it in the direction of arrow F. Now, applicator 414 is exposed to fluid reservoir 458.

Figure 13:
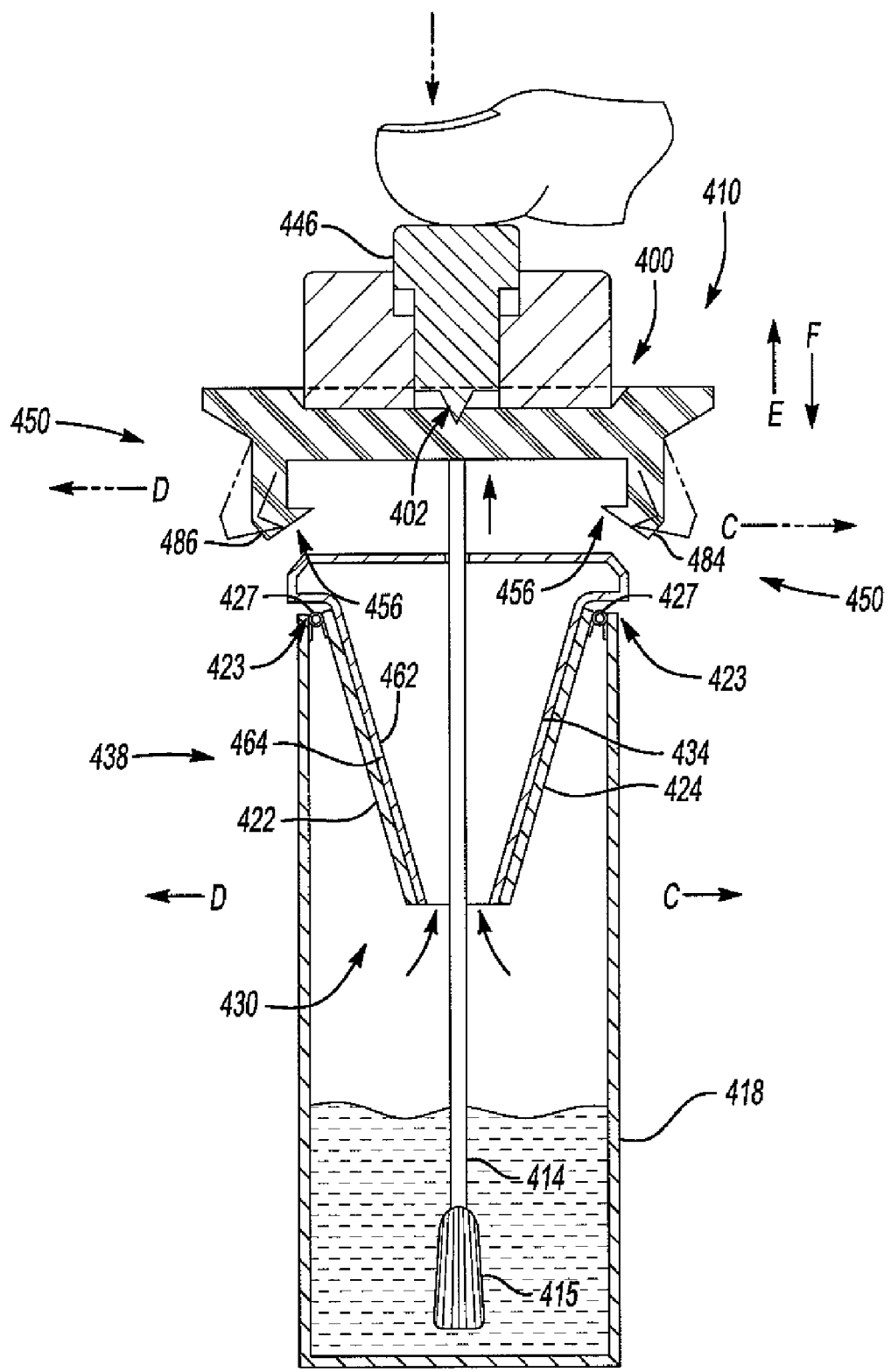
FIG. 13 illustrates the block of FIGS. 11 and 12 in a position to place the wipers in a second wiping position.

As shown in FIG. 13, block 434 is releasably coupled to applicator 414 by catches 484, 486, which are formed as part of cap 400. Cap 400 is connected to applicator 414. Block 434 is shown in unreleased position 454 in FIGS. 11 and 12. Cap 400 and catches 484, 486 are made of a resilient material, such as plastic. Release 446 is slideably received in cap 400 and may move in the direction of arrow F to apply pressure to break 402, which is a channel in the plastic to permit flexing of catches 484, 486 in the direction of arrows C and D, respectively. To prevent applicator 414 from being wiped again, as shown in FIG. 13, release 446 is actuated by depressing it in the direction of arrow F. This action causes catches 484, 486 to bend resiliently in the direction of arrow C for catch 484 and in the direction of arrow D for catch 486. Catches 484 and 486 accordingly pivot away from block 434 to release block 434 to released position 450 wherein block 434 is no longer coupled to catches 484 and 488 and consequently applicator 414. Block 434 has a hollow 464 that permits applicator 414 to slide freely within block 434 when block 34 is released from cap 400. When applicator 414 is moved in the direction of arrow E and lifted from bottle 418, as shown in FIG. 3, block 434 is left in second block position 438 to prevent wiper 422 and 424 from contacting applicator 414, maintaining wipers 422, 424 in second wiping position 430. Hence, when applicator 414 is withdrawn, wipers 422 and 424 will not wipe applicator 414 including brush 415.

Figure 14:
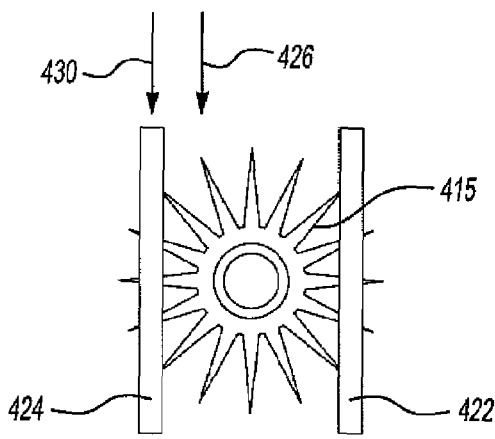
FIG. 14 shows another view of the wipers and applicator of FIGS. 11-13.

Alternatively, as seen from an overview, as shown in FIG. 14, wipers 422 and 424 can be spaced so that they wipe brush 415 of applicator 414 in varying amounts. FIG. 14 shows the position of wipers 422 and 424 relative to brush 415 from a bottom of bottle 418 view. Here, first wiping position 426 is shown closer to brush 415 than second wiping position 430, which is still in contact with brush 415.

Figure 15:
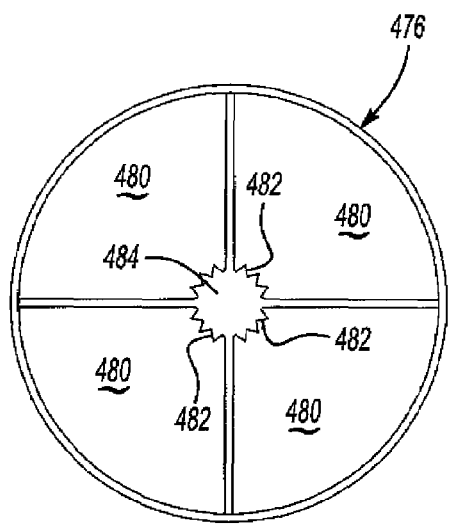
FIG. 15 shows an alternative version of wipers.
Figure 16:
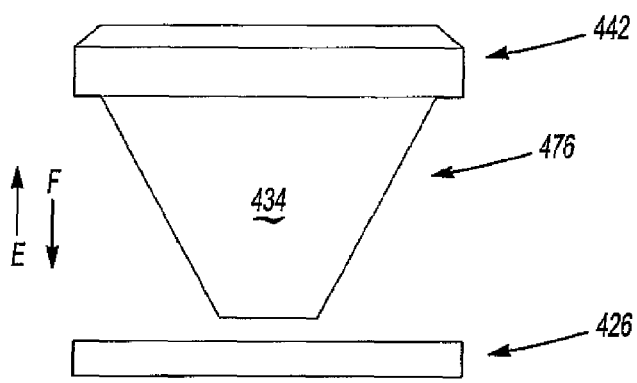
FIG. 16 shows another a view of the wipers of FIG. 15.
Figure 17:
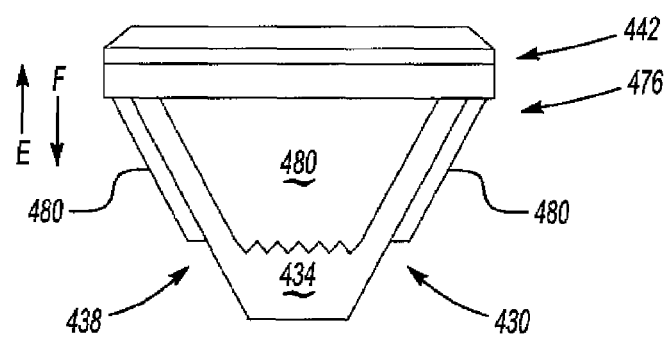
FIG. 17 shows another view of the wipers of FIG. 15 and FIG. 16.

FIG. 15-17 show alternative wiper arrangement 476. FIG. 15 shows wiper arrangement 476 from a bottom of bottle 514 view while FIGS. 16-17 show wiper arrangement 476 from a side of bottle view. In these figures are shown four wipers, 480, which when in first wiping position 426 as shown in FIG. 15, form a resiliently biased aperture 484 (see FIG. 15), sized a little smaller than the overall diameter of brush 415. Wipers 480 may be firm rubber flaps or, alternatively, may be spring biased to close like the wipers of FIGS. 11-13. Wipers 480 preferably have serrated edges 482 that help clean brush 415.

Wipers 480 are movable between first wiping position 426 shown in FIG. 16 and second wiping position 430 shown in FIG. 17 in the direction of arrow E and F as described in the version shown in FIGS. 11-13 by movement of block 434. When block 434 is in first block position 442 as shown in FIG. 16, wipers 480 are in first wiping position 430 as shown in FIGS. 15 and 16. When block 434 is moved in the direction of arrow F to second block position 438, then wipers 480 are opened to second wiping position 430 shown in FIG. 17. In second wiping position 430, aperture 484 is larger and wipers 480 have subsequently decreased (or no) contact with brush 415. If block 434 is moved in the direction of arrow E back to first block position 442, the resiliency of wipers 480 urges them to first wiping position 430 shown in FIG. 16. It will be appreciated that several wiping positions can be created by movement of block 434 at any position between directions E and F. In this manner, varying degrees of mascara will be wiped off brush 415 by virtue of the degree of contact wipers 480 have with brush 415 as permitted by block 434.

Figures 18, 19:
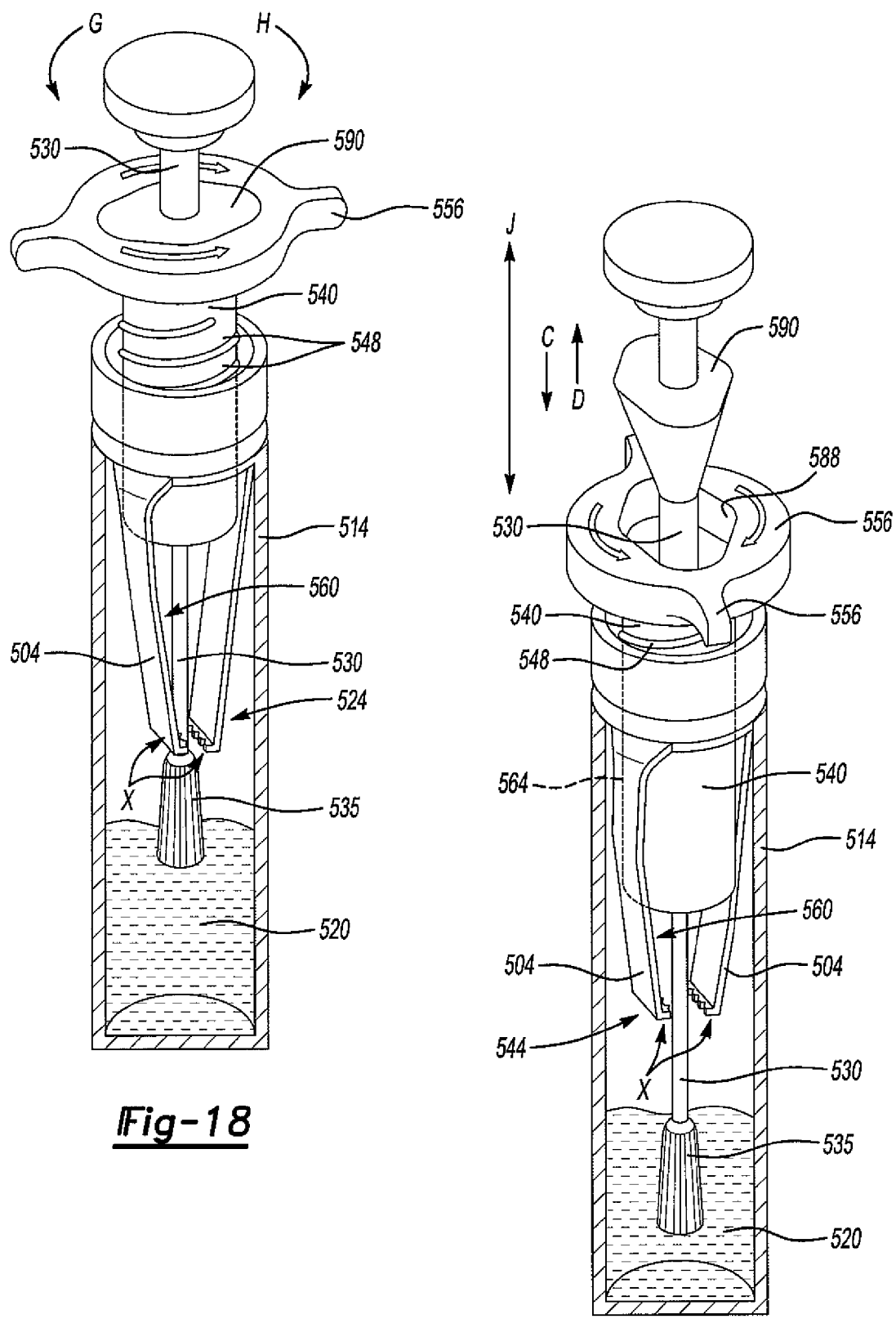
FIG. 18 shows an alternative version of a cosmetic bottle assembly with wipers in first wiping position.
FIG. 19 shows the cosmetic bottle assembly of FIG. 18 with wipers in second wiping position.
Figures 20, 21:
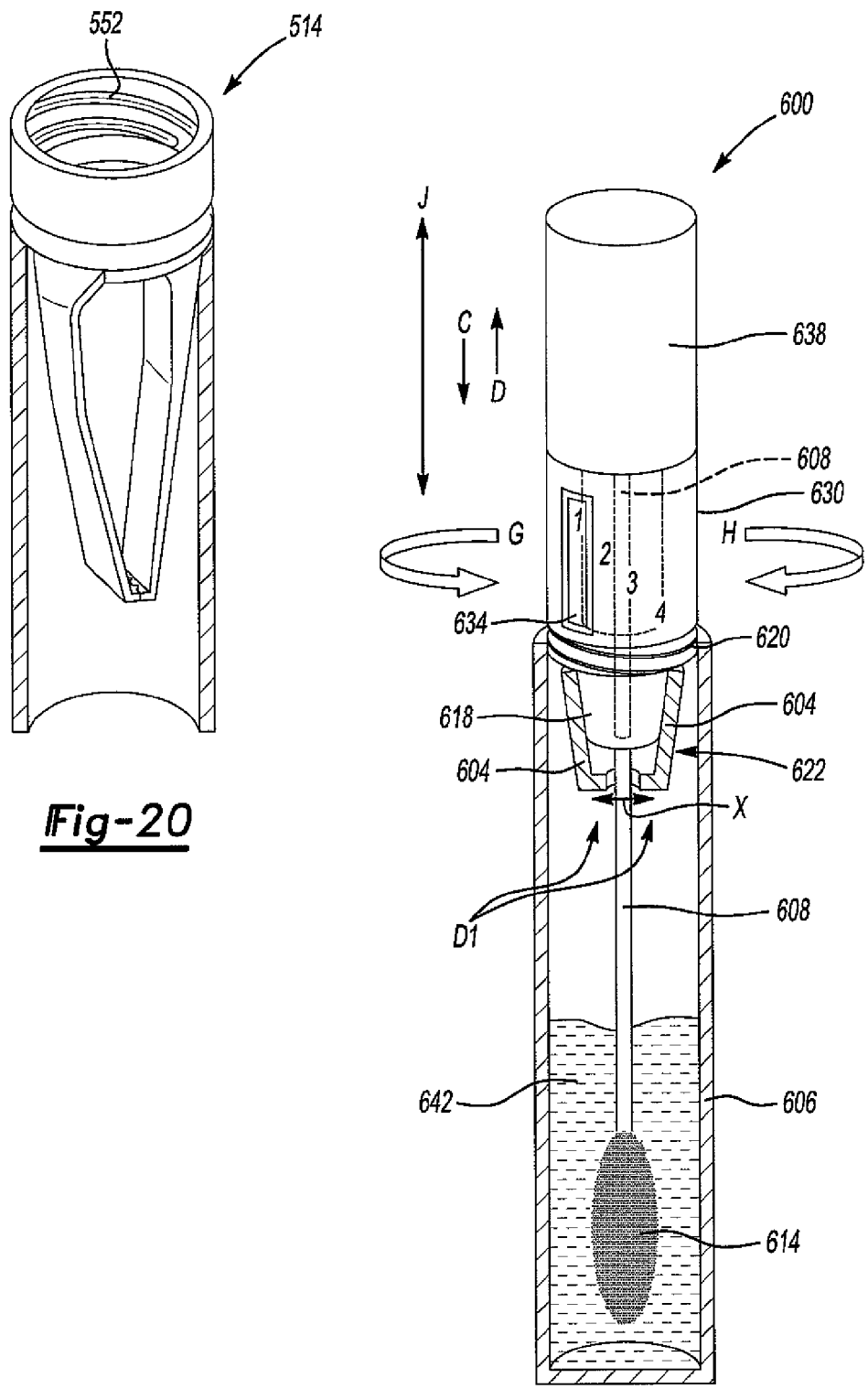
FIG. 20 shows the cosmetic bottle assembly of FIGS. 18 and 19, highlighting the threading of the bottle.
FIG. 21 shows another version of a cosmetic bottle assembly with wipers in first wiping position.

Another version of a fluid reservoir wiper assembly is shown in FIGS. 18-20. There is shown cosmetic bottle assembly 500 having fluid 520, say for a mascara. Cosmetic bottle assembly 500 has wipers 504, each resiliently biased to first wiping position 524 as shown in FIG. 15 and movable by block 540 to second wiping position 544. In addition, applicator 530 with brush 535 is shown disposed in fluid reservoir 520.

Block 540, a cylinder, has threads 548 and is threadedly received by bottle 514, which has mating threads 552 as shown in FIG. 20. Block 540 has integrally formed handle 556. Block is movable along block path J, either in the direction of arrow C into bottle 514 or in the direction of arrow D out of bottle 514. Turning handle 556 and therefore block 540 in the direction of arrow G moves block 540 in the direction of arrow D while turning in the direction of arrow H moves block 540 in the direction of arrow C.

As shown, wiper 504 has wiper surface 560, which is angled and extends transversely to block surface 564. Wiper 504 extends transversely across block path J. Accordingly, movement of block 540 in the direction of arrow C moves wipers 504 away from each other while movement in the direction of arrow D moves wipers 504 toward each other. In this way, the distance X between wipers 504 can be increased or decreased simply by turning handle 556 in the direction of arrow G or the direction of arrow H, thereby providing a way to vary the level of wiping by wipers 504.

Hence, FIG. 18 shows wipers 504 in first wiping position 524 while FIG. 19 shows wipers 504 in second wiping position 544. As shown, first wiping position 524 is closer to applicator 530 than second wiping position 544. First wiping position 524 provides maximum wiping of brush 535 by wipers 504. Second wiping position 544 may provide no wiping or minimal wiping of brush 535 by wipers 504. In this version, a multiplicity of wiping positions between first wiping position 524 and second wiping position 544 are available by adjusting the amount of turning of handle 556.

Block 540 is a hollow cylinder and has hole 588 that receives applicator 530. Applicator 530 may be withdrawn from bottle 514 and block 540 in the direction of arrow D without brush 535 contacting the sides of hole 588. Withdrawing applicator 530 in this direction causes applicator 530, including brush 540, to be wiped by wipers 504. Applicator 530 also has stop 590, which is conically tapered. Hole 588 is also conically tapered and sized to match stop 590. Hole 588 is accordingly shaped to receive stop 590 and prevent stop 590 from passing all the way through hole 588 to bottom of bottle 514 because of hole 588's tapering shape.

Figure 22:
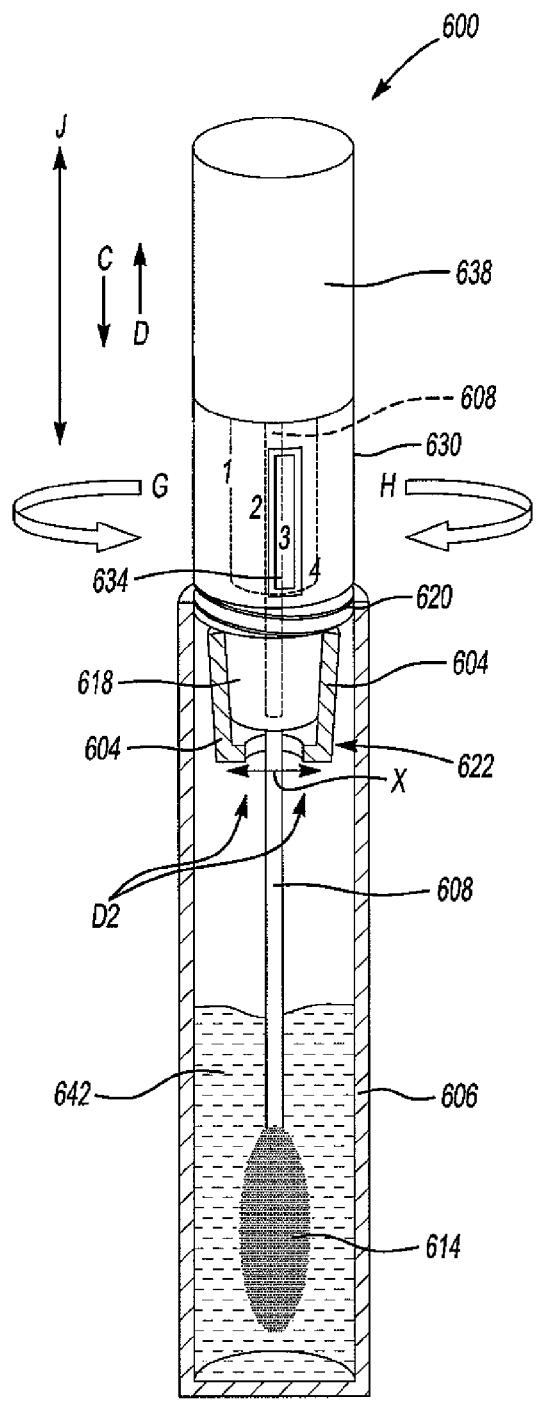
FIG. 22 shows the version of the cosmetic bottle assembly of FIG. 21 with wipers in second wiping position.

FIGS. 21-22 show another variation of the invention, cosmetic bottle assembly 600 with fluid reservoir 642 for storing a fluid such as mascara. Cosmetic bottle assembly has wipers 604, applicator 608 with brush 614, and block 618—all shown disposed in bottle 606. Wipers 604 are resiliently biased towards each other.

Figure 23:
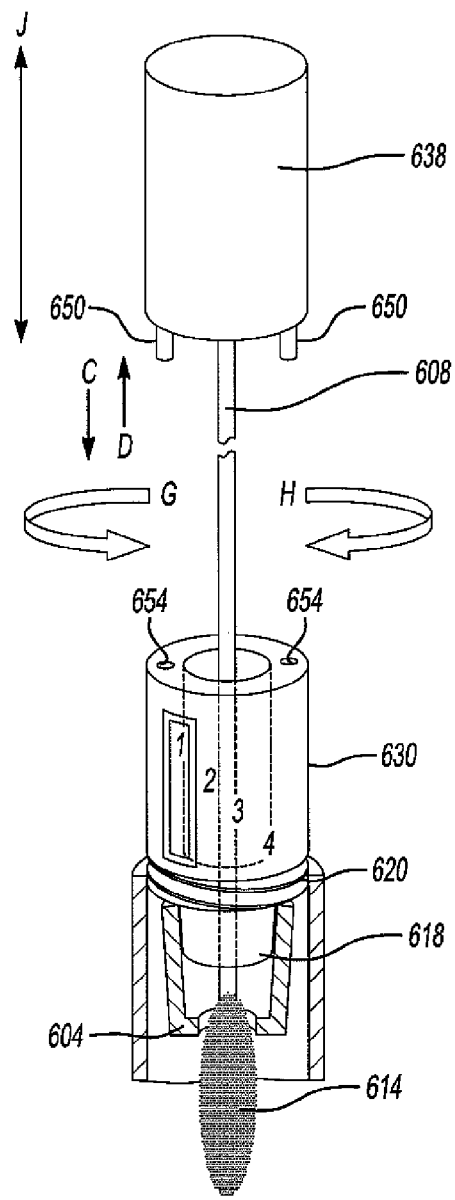
FIG. 23 shows another view of the cosmetic bottle assembly, including applicator handle.

Handle 630 is integral with block 618. Block 618 and handle 630 are hollow to receive applicator 608, which may move along path J, independently of handle 630 and block 618 as shown in FIG. 23. In addition, applicator handle 638 has protrusions 650, which may be slideably received by mating holes 654 of handle 630. When protrusions 650 are engaged to holes 654, applicator handle 638 is rotatable with handle 630 in the direction of arrow G or arrow H to move block 618. Further like the version shown in FIGS. 18-20, block 618 has threads 620 (see FIGS. 21-22) and bottle 606 has mating threads (not shown). Accordingly, block 618 is threadedly engaged to bottle 606 so as to move in the direction of arrow D when handle 630 is turned (directly or by turning engaged applicator handle 638) in the direction of arrow G and to move in the direction of arrow C when handle 630 is turned in the direction of arrow H. By moving block 618 in the direction of either arrow C or arrow D, the distance X between wipers 604 can be adjusted to increase or decrease the level of wiping. Handle 630 has level indicator 634, which is numbered "1" through "4", with number "1" indicating the highest level of wiping and number "4" indicating the lowest level of wiping. In this manner, the user will achieve a known predetermined amount of mascara, as the maximum amount of mascara will remain on brush 415 when the level indicated is "4" while turning clockwise towards lower levels "3", "2" and "1" will result in decreasing amounts of mascara remaining on brush 415.

Applicator 608 may be inserted in the direction of arrow C and withdrawn in the direction of arrow D from bottle 606 along path J through applicator handle 638 without contacting block 618 and handle 630 as shown in FIG. 23. Withdrawing applicator 608 in this manner allows brush 614 to be automatically wiped by wipers 608. FIG. 21 shows wipers 604 at first wiping position 626. Here, handle 630 is shown at level "1", with wipers 604 in their closest position, a distance D1 apart. Distance D1 ensures maximum level of wiping of brush 614 of applicator 608 when applicator 608 is withdrawn in the direction of arrow D along path J. To adjust the level of wiping, handle 630 is turned in the direction of arrow H to a higher level, say level "3", to move block 618 in the direction of arrow C, which widens distance X between wipers 604 to distance D2, a distance greater than D1. At level "3", there is less pressure on brush 614 of applicator 608 when withdrawn in the direction of arrow D along path J. In this way, the level of wiping of brush 614 can be adjusted conveniently and simply in fixed amounts and without mess.

Figure 24:
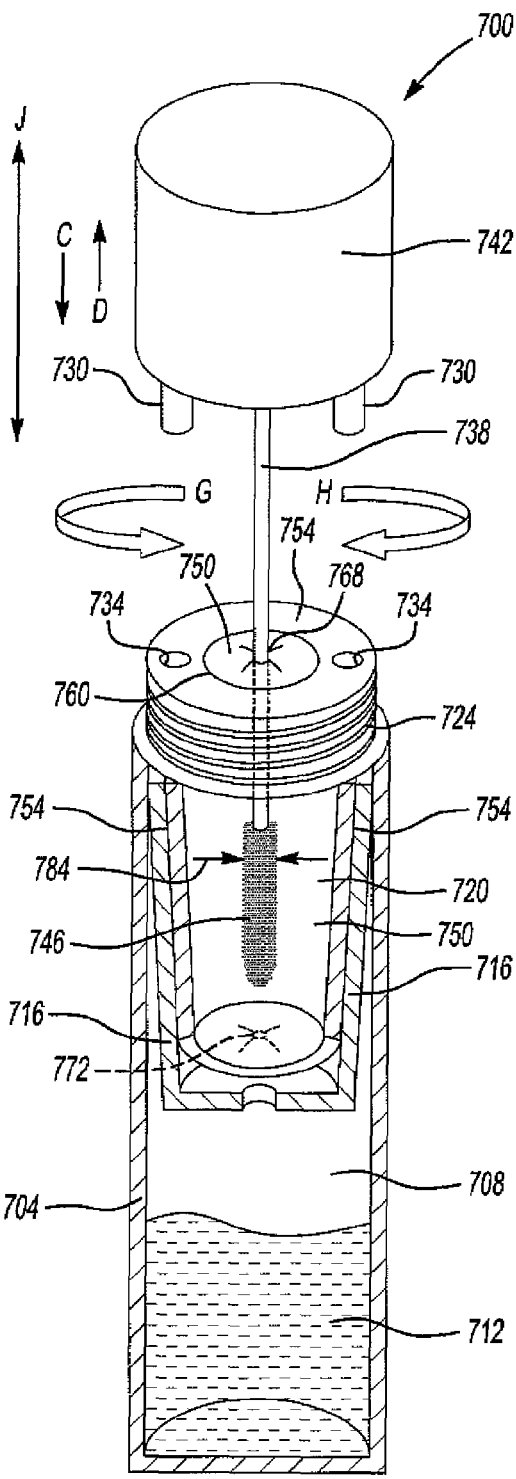
FIG. 24 shows another version of a cosmetic bottle assembly.
Figure 25:
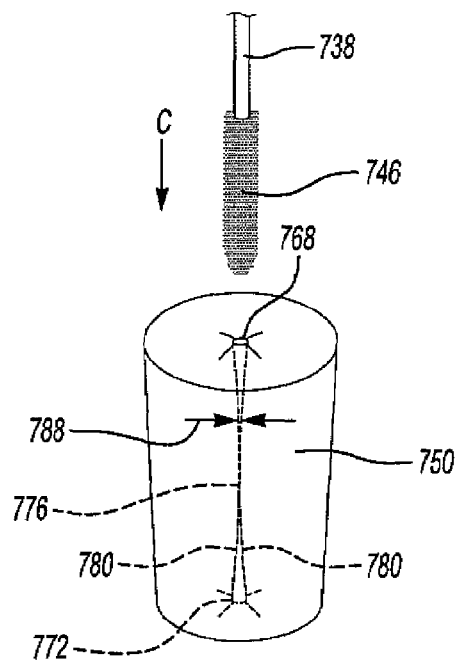
FIG. 25 shows a sealing body of the cosmetic bottle assembly of FIG. 24.
Figure 26:
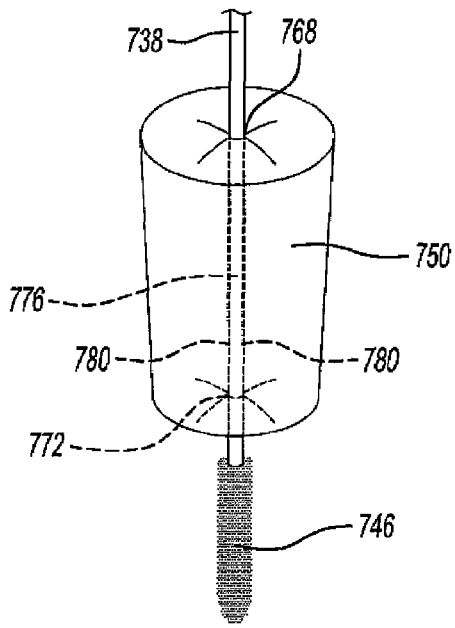
FIG. 26 shows the sealing body of FIG. 25 with applicator disposed therein.

FIGS. 24-26 show another version of a cosmetic bottle assembly. Here, as shown in FIG. 24, cosmetic bottle assembly 700 has bottle 704 having fluid reservoir 708 with cosmetic fluid 712, here mascara. Disposed within bottle 704 are wipers 716, which are resiliently biased towards each other. Also disposed in bottle 704 is block 720. Block 720 has threads 724, which are threadedly received by bottle 704, which has mating threads (not shown).

Applicator 738 has applicator handle 742 and brush 746. Applicator handle 742 has protrusions 730 that are slideably engageable to holes 734 of block 720. When protrusions 730 are engaged in holes 734, applicator handle 742 is rotatable with block 720. As in the version shown FIG. 21-23, turning applicator handle 742 in the direction of arrow G moves block 720 in the direction of arrow D while turning in the direction of arrow C moves block 720 in the direction of arrow C. Movement of block 720 causes wipers 716 to move closer or farther apart like the version of FIG. 21-23.

Unlike the prior version, block 720 of cosmetic bottle assembly 700 comprises sealing body 750 covered by casing 754. Casing 754 is a rigid frustroconical shell that encases sealing body 750 and has threads 724 to engage bottle 704. Casing 754 further has openings 760 that are wide enough to allow brush 746 of applicator 738 to pass through without contact if moved along path J. Casing 754 retains sealing body 750 and discourages movement in the direction of arrow C or arrow D when applicator 738 is moved in these same directions.

Sealing body 750 provides a seal for bottle 704 to prevent drying and clumping of cosmetic fluid 712. Sealing body 750 is a resilient material, such as silicone rubber. As shown in FIG. 25, sealing body 750 has channel 776 with first opening 768 and second opening 772. Due to the highly resilient nature of sealing body 750, channel 776, first opening 768 and second opening 772 is resiliently flexible between two widths, first width 784 and second width 788. First width 784 is shown in FIG. 24 and is large enough to accommodate applicator 738, including brush 764. Second width 788 is shown in FIG. 25 and is preferably small enough to help prevent air from passing along path J to enter bottle 704 and drying out cosmetic fluid 712. Channel 776, first opening 768 and second opening 772 are resilient biased towards second width 788.

When brush 764 is inserted in the direction of arrow C into sealing body 750 of block 720, first opening 768 and channel 776 enlarge to first width 784 to accommodate brush 764. Because of resilient bias toward second width 788, when brush 764 is in the position shown in FIG. 24, first opening 768 and channel 776 sealingly encase applicator 738 while second opening 772 remains at second width 788. In this position, bottle 704 is still sealed by sealing body 750.

As shown in FIG. 26, when brush 764 has been inserted passed sealing body 750, first opening 768, channel 776 and second opening 772 have enlarged to accommodate applicator 738. However, due to the resilient nature of sealing body 750, a seal is still created along the length of applicator 738 by channel wall 780, which, due to the resilient nature of sealing body 750, continues to squeeze applicator 738. In this way, bottle 704 remains sealed at all times, preventing the drying and clumping of cosmetic fluid 712. Moreover, silicone rubber is non-absorbent. Consequently, withdrawal of applicator 738 through sealing body 750 will not affect wiping of brush 746 significantly so that most wiping can be accomplished by wipers 716.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A fluid reservoir wiper assembly, comprising:
   a fluid reservoir for storing a fluid;
   an inserter for insertion into said fluid reservoir;
   a wiper for wiping fluid from said inserter, said wiper having a first wiping position and a second wiping position within said fluid reservoir, said first wiping position closer to said inserter than said second wiping position; and
   a block configured to be disposed between said wiper and said inserter, said block configured to selectively allow said wiper to move between said first wiping position and said second wiping position.

2. The assembly of claim 1 wherein said fluid reservoir is for storing a cosmetic fluid, said inserter is an applicator for applying the cosmetic fluid, said applicator configured to be insertable and removable from said fluid reservoir along a path and wherein said wiper is closer to said applicator in said first wiping position than in said second wiping position when said applicator is moved along said path.

3. The assembly of claim 1 wherein said wiper is resiliently biased toward said first wiping position.

4. The assembly of claim 1 wherein said block has a first block position for maintaining said wiper in said first wiping position and a second block position for maintaining said wiper in said second wiping position.

5. The assembly of claim 1 wherein said block is selectively engageable to said inserter.

6. The assembly of claim 5 wherein said block has a release, said release having a released position and an unreleased position, said block coupled to said inserter when said release is in said unreleased position and decoupled from said inserter when said release is in said released position.

7. The assembly of claim 6 wherein said block is disposed in said second block position when released.

8. The assembly of claim 7 wherein said wiper is blocked from moving to said first wiping position by said block when said block is in said second block position.

9. The assembly of claim 4 wherein said block is rotatable between said first block position and said second block position.

10. The assembly of claim 9 wherein said block is moveable along a block path, said wiper extends transversely across said block path.

11. The assembly of claim 1 wherein said wiper is pivotable between said first wiping position and said second wiping position.

12. The assembly of claim 1 wherein said block has a channel for receiving said inserter, said channel having a first width and a second width, said first width large enough to accommodate said inserter and said second width smaller than said first width, wherein said channel is resiliently biased toward said second width.

13. A bottle assembly for a cosmetic fluid, comprising:
a bottle for storing a cosmetic fluid;
an applicator for applying the cosmetic fluid, said applicator configured to be insertable and removable from said bottle along a path;
a wiper for wiping the cosmetic fluid from said applicator, said wiper having a first wiping position and a second wiping position within said bottle, said wiper resiliently biased toward said first wiping position, wherein said wiper is closer to said applicator when said applicator is moved along said path in said first wiping position than in said second wiping position; and
a block configured to be disposed between said wiper and said applicator, said block configured to selectively allow said wiper to move between said first wiping position and said second wiping position.

14. The assembly of claim 13 wherein said block has a first block position for maintaining said wiper in said first wiping position and a second block position for maintaining said wiper in said second wiping position.

15. The assembly of claim 14 wherein said block is selectively engageable to said applicator.

16. The assembly of claim 15 wherein said block has a release, said release having a released position and an unreleased position, said block coupled to said applicator when said release is in said unreleased position and decoupled from said applicator when said release is in said released position.

17. The assembly of claim 16 wherein said block is disposed in said second block position when released.

18. The assembly of claim 17 wherein said wiper is blocked from moving to said first wiping position by said block when said block is in said second block position.

19. The assembly of claim 14 wherein said block is rotatable between said first block position and said second block position.

20. A method of removing cosmetic fluid from a bottle, the method comprising:
inserting an applicator for a cosmetic fluid into a bottle along a path, the applicator proximate a wiper disposed in the bottle wherein the wiper has a first wiping position and a second wiping position, the first wiping position disposing the wiper closer to the applicator than in the second wiping position when the applicator is moved along the path;
selecting between the first wiping position and the second wiping position by moving a block disposed between the wiper and the applicator; and
withdrawing the applicator from the bottle.

* * * * *